(12) United States Patent
Gupta

(10) Patent No.: US 9,298,645 B2
(45) Date of Patent: *Mar. 29, 2016

(54) WRITING ADJACENT TRACKS TO A STRIDE, BASED ON A COMPARISON OF A DESTAGING OF TRACKS TO A DEFRAGMENTATION OF THE STRIDE

(71) Applicant: International Business Machines Corporation, Armonk, NY (US)

(72) Inventor: Lokesh M. Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/735,862

(22) Filed: Jun. 10, 2015

(65) Prior Publication Data

US 2015/0278115 A1    Oct. 1, 2015

Related U.S. Application Data

(63) Continuation of application No. 14/504,008, filed on Oct. 1, 2014, now Pat. No. 9,086,816, which is a continuation of application No. 13/787,696, filed on Mar. 6, 2013, now Pat. No. 8,880,840, which is a continuation of application No. 13/087,236, filed on Apr. 14, 2011, now Pat. No. 8,880,839.

(51) Int. Cl.
| | |
|---|---|
| *G06F 12/12* | (2006.01) |
| *G06F 3/06* | (2006.01) |
| *G06F 12/08* | (2006.01) |

(52) U.S. Cl.
CPC ............. *G06F 12/128* (2013.01); *G06F 3/061* (2013.01); *G06F 3/064* (2013.01); *G06F 3/0608* (2013.01);

(Continued)

(58) Field of Classification Search
CPC ... G06F 12/128; G06F 12/023; G06F 12/025; G06F 12/0866; G06F 12/0871; G06F 12/0833; G06F 3/0619; G06F 3/0689; G06F 3/0665; G06F 3/061; G06F 3/064; G06F 3/0652; G06F 3/0608; G06F 3/0641; G06F 2003/0692; G06F 2212/262; G06F 2212/225; G06F 2212/6042; G06F 2212/462; G06F 2212/62; G06F 2212/69; G11B 20/12; G11B 20/1252
See application file for complete search history.

(56) References Cited

U.S. PATENT DOCUMENTS

| | | |
|---|---|---|
| 5,734,892 A | 3/1998 | Chu |
| 6,028,725 A | 2/2000 | Blumenan |

(Continued)

OTHER PUBLICATIONS

Response to Office Action, dated Nov. 2, 2015, for U.S. Appl. No. 14/734,858, filed Jun. 9, 2015, invented by Lokesh M. Gupta et al., Total 3 pages.

(Continued)

*Primary Examiner* — Matthew Bradley
*Assistant Examiner* — Rocio Del Mar Perez-Velez
(74) *Attorney, Agent, or Firm* — Rabindranath Dutta; Konrad, Raynes, Davda and Victor LLP

(57) ABSTRACT

Compressed data is maintained in a plurality of strides of a redundant array of independent disks, wherein a stride is configurable to store a plurality of tracks. A request is received to write one or more tracks. The one or more tracks are written to a selected stride of the plurality of strides, based on comparing the number of operations required to destage selected tracks from the selected stride to the number of operations required to defragment the compressed data in the selected stride.

18 Claims, 6 Drawing Sheets

(52) U.S. Cl.
CPC ............ *G06F 3/0619* (2013.01); *G06F 3/0641* (2013.01); *G06F 3/0652* (2013.01); *G06F 3/0665* (2013.01); *G06F 3/0689* (2013.01); *G06F 12/0833* (2013.01); *G06F 12/0871* (2013.01); *G06F 12/0866* (2013.01); *G06F 2003/0692* (2013.01); *G06F 2212/225* (2013.01); *G06F 2212/262* (2013.01); *G06F 2212/462* (2013.01); *G06F 2212/6042* (2013.01); *G06F 2212/62* (2013.01); *G06F 2212/69* (2013.01)

(56) References Cited

U.S. PATENT DOCUMENTS

| | | | |
|---|---|---|---|
| 6,260,115 B1 | 7/2001 | Permut et al. | |
| 6,532,121 B1 | 3/2003 | Rust et al. | |
| 6,532,517 B1 | 3/2003 | Wagner et al. | |
| 6,704,837 B2* | 3/2004 | Beardsley et al. | 711/114 |
| 7,062,604 B1 | 6/2006 | Nanda | |
| 7,447,836 B2* | 11/2008 | Zhang et al. | 711/113 |
| 7,512,862 B1 | 3/2009 | Taylor | |
| 7,577,787 B1* | 8/2009 | Yochai et al. | 711/113 |
| 8,838,890 B2 | 9/2014 | Gupta | |
| 8,843,704 B2 | 9/2014 | Gupta | |
| 8,880,839 B2 | 11/2014 | Gupta | |
| 8,880,840 B2 | 11/2014 | Gupta | |
| 9,086,815 B2 | 7/2015 | Gupta | |
| 9,086,816 B2 | 7/2015 | Gupta | |
| 9,086,822 B2 | 7/2015 | Gupta | |
| 2004/0093463 A1* | 5/2004 | Shang | 711/113 |
| 2005/0050279 A1* | 3/2005 | Chiu et al. | 711/137 |
| 2005/0228963 A1* | 10/2005 | Rothman et al. | 711/170 |
| 2005/0257083 A1 | 11/2005 | Cousins | |
| 2008/0040553 A1 | 2/2008 | Ash et al. | |
| 2008/0077762 A1* | 3/2008 | Scott et al. | 711/170 |
| 2009/0049238 A1* | 2/2009 | Zhang et al. | 711/113 |
| 2010/0017578 A1 | 1/2010 | Mansson et al. | |
| 2010/0211737 A1 | 8/2010 | Flynn et al. | |
| 2010/0250864 A1 | 9/2010 | Carty | |
| 2010/0298999 A1* | 11/2010 | Allgaier et al. | 700/296 |
| 2011/0107052 A1 | 5/2011 | Narayanasamy | |
| 2011/0196987 A1* | 8/2011 | Benhase et al. | 709/247 |
| 2012/0011319 A1* | 1/2012 | Yochai et al. | 711/114 |

OTHER PUBLICATIONS

Lee et al. "Performance Analysis of a Selectively Compressed Memory System", Microprocessors and Microsystems, 2002, 14 pgs.
US Patent Application, dated Jun. 9, 2015, for U.S. Appl. No. 14/734,858, filed Jun. 9, 2015, invented by Lokesh M. Gupta et al., Total 31 pages.
US Patent Application, dated Jun. 4, 2015, for U.S. Appl. No. 14/730,716, filed Jun. 10, 2015, invented by Lokesh M. Gupta et al., Total 29 pages.
Preliminary Amendment, dated May 13, 2011, for U.S. Appl. No. 13/087,226, filed Apr. 14, 2011, invented by Lokesh M. Gupta et al, Total 10 pages.
Preliminary Amendment, dated Mar. 8, 2013, for U.S. Appl. No. 13/087,226, filed Apr. 14, 2011, invented by Lokesh M. Gupta et al, Total 6 pages.
Office Action, dated Jun. 7, 2013, for U.S. Appl. No. 13/087,226, filed Apr. 14, 2011, invented by Lokesh M. Gupta et al, Total 22 pages.
Response to Office Action, dated Sep. 9, 2013, for U.S. Appl. No. 13/087,226, filed Apr. 14, 2011, invented by Lokesh M. Gupta et al., Total 12 pages.
Final Office Action, dated Sep. 30, 2013, for U.S. Appl. No. 13/087,226, filed Apr. 14, 2011, invented by Lokesh M. Gupta et al., Total 22 pages.
Response to Final Office Action, dated Dec. 30, 2013, or U.S. Appl. No. 13/087,226, filed Apr. 14, 2011, invented by Lokesh M. Gupta et al., Total 3 pages.
Final Office Action, dated Jan. 17, 2014, for U.S. Appl. No. 13/087,226, filed Apr. 14, 2011, invented by Lokesh M. Gupta et al., Total 14 pages.
Response to Final Office Action, dated Apr. 11, 2014, for U.S. Appl. No. 13/087,226, filed Apr. 14, 2011, invented by Lokesh M. Gupta et al., Total 13 pages.
Notice of Allowance, dated May 14, 2014, for U.S. Appl. No. 13/087,226, filed Apr. 14, 2011, invented by Lokesh M. Gupta et al., Total 16 pages.
Preliminary Amendment, dated Mar, 8, 2013, for U.S. Appl. No. 13/791,486, filed Mar. 8, 2013, invented by Lokesh M. Gupta et al., Total 5 pages.
Office Action, dated Sep. 27, 2013, for U.S. Appl. No. 13/791,486, filed Aug. 13, 2013, invented by Lokesh M. Gupta et al., Total 24 pages.
Response to Office Action, dated Dec. 27, 2013, for U.S. Appl. No. 13/791,486, filed Aug. 13, 2013, invented by Lokesh M. Gupta et al., Total 10 pages.
Final Office Action, dated Jan. 17, 2014, for U.S. Appl. No. 13/791,486, filed Aug. 13, 2013, invented by Lokesh M. Gupta et al., Total 16 pages.
Response to Final Office Action, dated Apr. 11, 2014, for U.S. Appl. No. 13/791,486, filed Aug. 13, 2013, invented by Lokesh M. Gupta et al., Total 9 pages.
Notice of Allowance, dated May 14, 2014, for U.S. Appl. No. 13/791,486, filed Aug. 13, 2013, invented by Lokesh M. Gupta et al., Total 16 pages.
Preliminary Amendment, dated Mar. 6, 2013, for U.S. Appl. No. 13/087,236, filed Apr. 14, 2011, invented by Lokesh M. Gupta et al., Total 6 pages.
Preliminary Amendment, dated May 13, 2011, for U.S. Appl. No. 13/087,236, filed Apr. 14, 2011, invented by Lokesh M. Gupta et al., Total 9 pages.
Office Action, dated Aug. 8, 2013, for U.S. Appl. No. 13/087,236, filed Apr. 14, 2011, invented by Lokesh M. Gupta et al., Total 42 pages.
Response to Office Action, dated Dec. 9, 2013, for U.S. Appl. No. 13/087,236, filed Apr. 14, 2011, invented by Lokesh M. Gupta et al., Total 9 pages.
Notice of Allowance, dated Jan. 6, 2014, for U.S. Appl. No. 13/087,236, filed Apr. 14, 2011, invented by Lokesh M. Gupta et al., Total 15 pages.
Notice of Allowance, dated Apr. 11, 2014, for U.S. Appl. No. 13/087,236, filed Apr. 14, 2011, invented by Lokesh M. Gupta et al., Total 17 pages.
Notice of Allowance, dated Jun. 16, 2014, for U.S. Appl. No. 13/087,236, filed Apr. 14, 2011, invented by Lokesh M. Gupta et al., Total 16 pages.
Preliminary Remarks, dated Mar. 6, 2013, or U.S. Appl. No. 13/787,696, filed Mar. 6, 2013, invented by Lokesh M. Gupta, Total 2 pages.
Office Action, dated Aug. 19, 2013, for U.S. Appl. No. 13/787,696, filed Mar. 6, 2013, invented by Lokesh M. Gupta, Total 24 pages.
Response to Office Action, dated Nov. 19, 2013, for U.S. Appl. No. 13/787,696, filed Mar. 6, 2013, invented by Lokesh M. Gupta, Total 4 pages.
Office Action, dated Dec. 6, 2013, for U.S. Appl. No. 13/787,696, filed Mar. 6, 2013, invented by Lokesh M. Gupta, Total 22 pages.
Response to Office Action, dated Mar. 6, 2014, dated Mar. 6, 2013, for U.S. Appl. No. 13/787,696, filed Mar, 6, 2013, invented by Lokesh M. Gupta, Total 9 pages.
Notice of Allowance, dated Apr. 1, 2014, for U.S. Appl. No. 13/787,696, filed Mar. 6, 2013, invented by Lokesh M. Gupta, Total 17 pages.
Notice of Allowance, dated Jun. 17, 2014, dated Mar. 6, 2013, for U.S. Appl. No. 13/787,696, filed Mar. 6, 2013, invented by Lokesh M. Gupta, Total 13 pages.
312 Amendment, dated Sep. 11, 2014, for U.S. Appl. No. 13/787,696, filed Mar. 6, 2013, invented by Lokesh M. Gupta, Total 5 pages.
Office Action, dated Nov. 7, 2014, for U.S. Appl. No. 14/503,043, filed Sep. 30, 2014, invented by Lokesh M. Gupta et al., Total 28 pages.

(56) References Cited

OTHER PUBLICATIONS

Response to Office Action, dated Feb. 9, 2015, for U.S. Appl. No. 14/503,043, filed Sep. 30, 2014, invented by Lokesh M. Gupta et al., Total 2 pages.
Notice of Allowance, dated Mar. 13, 2015, for U.S. Appl. No. 14/503,043, filed Sep. 30, 2014, invented by Lokesh M. Gupta et al., Total 18 pages.
Office Action, dated Dec. 4, 2014, for U.S. Appl. No. 14/504,001, filed Oct. 1, 2014, invented by Lokesh M. Gupta et al., Total 20 pages.
Response to Office Action, dated Mar. 4, 2014, for U.S. Appl. No. 14/504,001, filed Oct. 1, 2014, invented by Lokesh M. Gupta et al., Total 3 pages.
Notice of Allowance, dated Mar. 17, 2015, for U.S. Appl. No. 14/504,001, filed Oct. 1, 2014, invented by Lokesh M. Gupta et al., Total 18 pages.
Office Action, dated Dec. 4, 2014, for U.S. Appl. No. 14/504,008, filed Oct. 1, 2014, invented by Lokesh M. Gupta et al., Total 30 pages.
Response to Office Action, dated Mar. 4, 2014, for U.S. Appl. No. 14/504,008, filed Oct. 1, 2014, invented by Lokesh M. Gupta et al., Total 3 pages.
Notice of Allowance, dated Mar. 13, 2015, for U.S. Appl. No. 14/504,008, filed Oct. 1, 2014, invented by Lokesh M. Gupta et al., Total 18 pages.
Office Action, dated Jul. 31, 2015, for U.S. Appl. No. 14/734,858, filed Jun. 9, 2015, invented by Lokesh M. Gupta et al., Total 7 pages.
Office Action, dated Jan. 5, 2016, for U.S. Appl. No. 14/730,716 (37.263C5), filed Jun. 4, 2015, invented by Lokesh M. Gupta et al., Total 45 pages.
Notice of Allowance, dated Nov. 18, 2015, for U.S. Appl. No. 14/734,858 (37263C6), filed Jun. 9, 2015, invented by Lokesh M. Gupta et al., Total 24 pages.

* cited by examiner

WRITING ADJACENT TRACKS TO A STRIDE, BASED ON A COMPARISON OF A DESTAGING OF TRACKS TO A DEFRAGMENTATION OF THE STRIDE

CROSS-REFERENCE TO RELATED APPLICATIONS

This application is a continuation of U.S. patent application Ser. No. 14/504,008, filed Oct. 1, 2014, wherein U.S. patent application Ser. No. 14/504,008 is a continuation of U.S. patent application Ser. No. 13/787.696, filed March 6, 2013 and issued as U.S. Pat. No. No. 8,880,840, wherein U.S. patent application Ser. No. 13/787,696 is a continuation of U.S. patent application Ser. No. 13/087,236, filed Apr. 14, 2011 and issued as U.S. Pat. No. 8,880,839, the disclosure of each of which is hereby incorporated herein by reference in its entirety.

BACKGROUND

1. Field

The disclosure relates to a method, system, and article of manufacture for writing adjacent tracks to a stride based on a comparison of a destaging of tracks to a defragmentation of the stride.

2. Background

A storage system may include a storage controller that controls a plurality of storage devices. The plurality of storage devices controlled by the storage controller may include solid state disks, hard disks, tapes, etc.

A host computational device may send input/output (I/O) requests to the storage controller. The storage controller may satisfy the I/O requests by reading data from one or more storage devices, or by writing data to one or more storage devices. Once the I/O requests are satisfied the storage controller may send appropriate responses to the host computational device.

SUMMARY OF THE PREFERRED EMBODIMENTS

Provided are a method, a system, and a computer program product in which compressed data is maintained in a plurality of strides of a redundant array of independent disks (RAID), wherein a stride is configurable to store a plurality of tracks. A request is received to write one or more tracks. The one or more tracks are written to a selected stride of the plurality of strides, based on comparing the number of operations required to destage selected tracks from the selected stride to the number of operations required to defragment the compressed data in the selected stride.

In further embodiments, a determination is made by a management application executing in a controller coupled to the redundant array of independent disks and a cache, as to whether a first estimated duration of time to perform the number of operations required to destage the selected tracks from the selected stride represented in the cache is a smaller amount of time in comparison to a second estimated duration of time required to defragment the compressed data in the selected stride represented in the cache. The selected tracks are destaged from the cache, by a destaging application executing in the controller, in response to determining that the first estimated duration of time is a smaller amount of time in comparison to the second estimated duration of time.

In yet further embodiments, in response to determining that the first estimated duration of time is not a smaller amount of time in comparison to the second estimated duration of time, a defragmentation application executing in the controller defragments the selected stride.

In additional embodiments, the writing the one or more tracks to the selected stride of the plurality of strides is performed subsequent to the destaging or the defragmenting. Additionally, the destaging or the defragmenting creates adequate space in the selected stride to write the one or more tracks.

In yet additional embodiments, the destaging of the selected tracks is performed by copying the selected tracks from the cache to physical storage, and by deleting the selected tracks in the selected stride represented in the cache. The defragmentation of the selected stride is performed by moving existing tracks in the selected stride adjacent to each other towards the beginning of the selected stride and creating contiguous free space towards the end of the selected stride.

In further embodiments, the redundant array of independent disks are configured to conform to a RAID-5 level in which data and parity striping is performed across all drives.

In additional embodiments, a deployment of computing infrastructure is performed. Computer-readable code is integrated into a computational system, wherein the computer-readable code in combination with the computational system performs the maintaining of the compressed data in the plurality of strides of the redundant array of independent disks, the receiving of the request to write the one or more tracks, and the writing the one or more tracks to the selected stride of the plurality of strides.

In yet additional embodiments, the integrating of the computer-readable code into the computational system is performed by downloading the computer-readable code to the computational system in a networked computing environment.

BRIEF DESCRIPTION OF THE DRAWINGS

Referring now to the drawings in which like reference numbers represent corresponding parts throughout.

DETAILED DESCRIPTION

Figure 1:
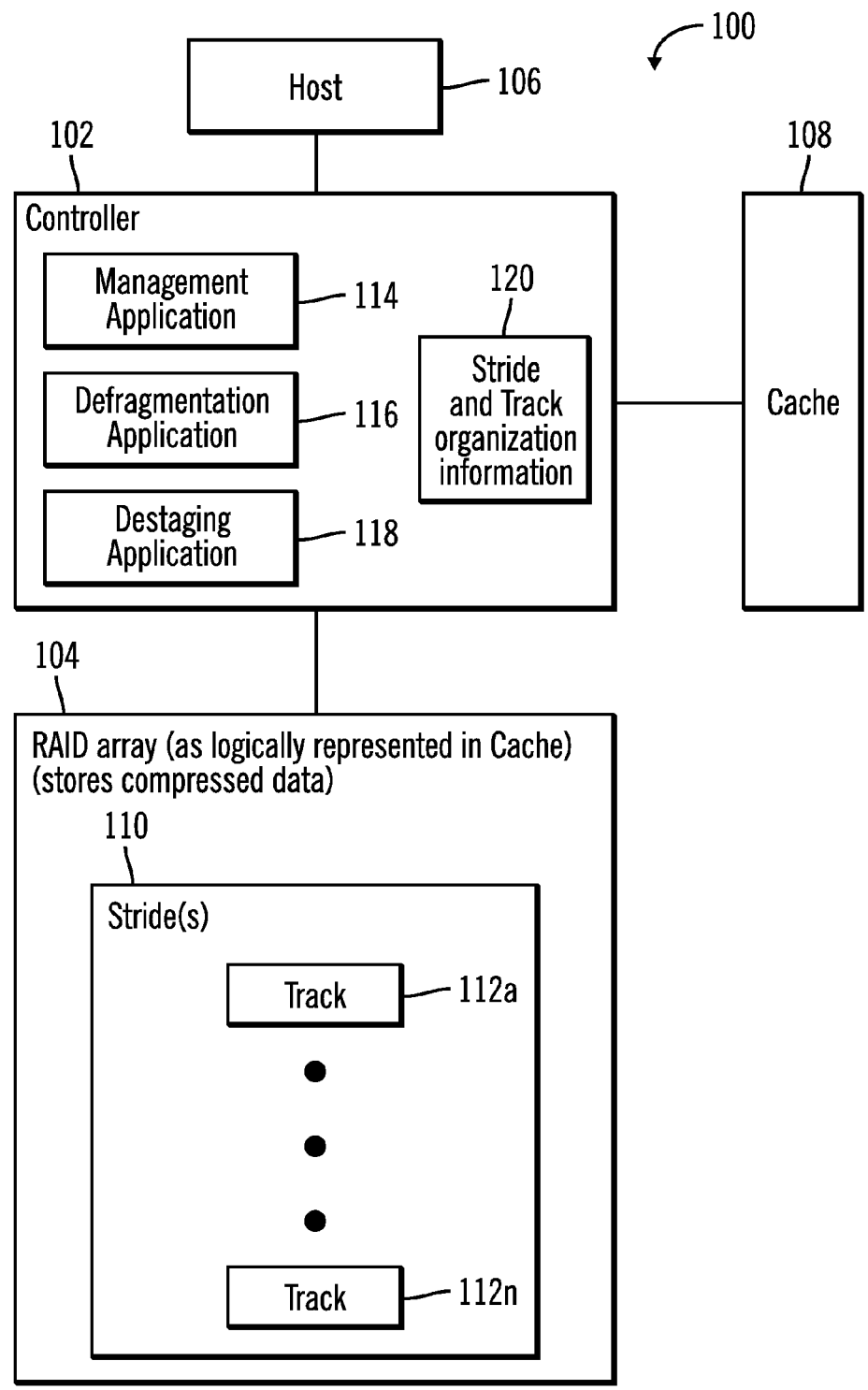
FIG. 1 illustrates a block diagram of a computing environment that includes a controller that controls a RAID array, in accordance with certain embodiments.

In the following description, reference is made to the accompanying drawings which form a part hereof and which illustrate several embodiments. It is understood that other embodiments may be utilized and structural and operational changes may be made.

A storage system may include a cache that may store frequently or recently used data. The cache may be implemented in a first storage device that can be accessed relatively faster in comparison to a second storage device. The storage capacity of the first storage device (i.e., the cache) is usually much smaller than the storage capacity of the second storage device. For example, the first storage device (i.e., the cache) may comprise a solid state device and the second storage device may comprise a disk drive A plurality of disk drives may be combined to form a special category of disk drive that is referred to as a Redundant Array of Independent Disks (RAID). RAID may provide a higher degree of fault tolerance for data. The physical disks of RAID may be said to be in a RAID array that may be addressed by an operating system as one single disk. A stride is a unit of storage in the RAID array and each stride may comprise a plurality of tracks, wherein a track represents one of a series of thin concentric rings on a disk, which the read/write head of the disk accesses and along which data is stored.

Data compression is the storing of data in a format that requires less storage space than the original data, wherein the original data is compressed to provide compressed data. In certain storage systems, a RAID array may be implemented in combination with a cache, and the RAID array may store compressed or uncompressed data.

Certain embodiments determine whether it is preferable to defragment a stride or whether it is preferable to destage tracks from the stride, in order to create contiguous free space within the stride.

When adequate contiguous space to store a plurality of adjacent tracks is not available in a stride that is represented in a cache, either the stride has to defragmented to generate contiguous space for the plurality of adjacent tracks or existing tracks of the stride has to be destaged. When a stride is defragmented, existing tracks within the stride are coalesced together and empty space between tracks is eliminated. When an existing track is destaged from the cache, the existing track is moved from the cache to some other storage with a slower response time than the cache. Both defragmentation and destaging operations may be relatively time consuming operations as they may involve the movement of a considerable amount of data that are stored in tracks.

Certain embodiments determine whether to perform defragmentation of a stride or whether to perform destaging of tracks to create adequate contiguous space to write a plurality of adjacent tracks to the stride. If defragmentation is likely to be faster then defragmentation is performed, whereas if destaging of tracks is likely to be faster then destaging of tracks is performed.

Details of Embodiments

FIG. 1 illustrates a block diagram of a computing environment 100 that includes a controller 102 that controls a RAID array 104, in accordance with certain embodiments. A host 106 may generate input/output (I/O) requests to the controller 102, causing the controller 102 to read or write tracks with respect to the RAID array 104 via a cache 108. The RAID array 104 is a logical representation of a combination of a plurality of disks, wherein a representation of the RAID array may be maintained in the cache 108 and operations on the RAID array 104 may be performed via the cache 108. The RAID array 104 may be configured to be of any type of RAID level. For example, in certain embodiments, the RAID array 104 is configured to conform to a RAID-5 level in which data and parity striping may be performed across all drives. In other embodiments, the RAID array 104 may be configured to be of some other type of RAID level such as RAID-1, RAID-2, RAID-3, RAID-4, RAID-6, etc.

The controller 102 and the host 106 may comprise any suitable computational device including those presently known in the art, such as, a personal computer, a workstation, a server, a mainframe, a hand held computer, a palm top computer, a telephony device, a network appliance, a blade computer, a server, etc. The controller 102, the RAID array 104, the host 106, and the cache 108 may be components in a distributed computing environment, such as a cloud computing environment or a networked computing environment.

In certain embodiments, the RAID array 104 may store one or more strides 110. Each stride 110 may store a plurality of tracks 112a . . . 112n. Each of the tracks 112a . . . 112n represent one of a series of thin concentric rings on a disk, which a read/write head accesses and along which data is stored in separate sectors. A stride is a unit of storage in a RAID array in which tracks may be stored. In certain embodiments, compressed data is stored in the strides 110 of the RAID array 104. In certain alternative embodiments, other units of storage besides strides may also be implemented in the RAID array 104.

In certain embodiments, the controller 102 has a management application 114, a defragmentation application 116, and a destaging application 118 that execute within the controller 102. The controller 102 also stores stride and track organization information 120 related to the strides 110 and the tracks 112a . . . 112n of the RAID array 104.

In certain embodiments, the management application 114 performs operations to control the RAID array 104 that is represented in the cache 108. The defragmentation application 116 may perform operations to defragment a stride 110. The destaging application 118 may perform operations to destage, i.e., move, tracks of the RAID array 104 from the cache 108 to some other storage that is slower than the cache 108. The stride and track organization information 120 is used by the management application 114, the defragmentation application 116, and the destaging application 118 to perform various operations related to the strides 110 and the tracks 112a . . . 112n.

Figure 2:
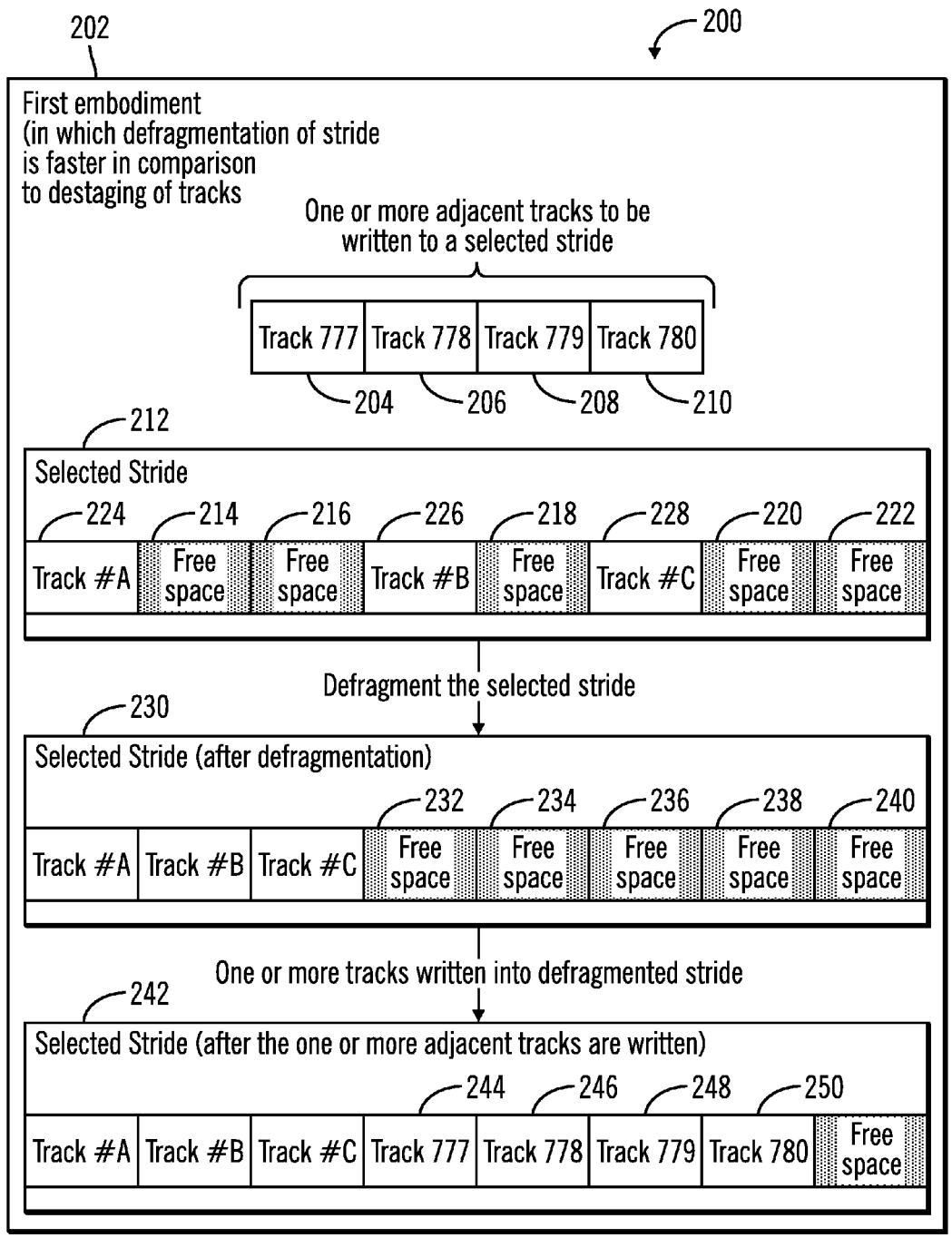
FIG. 2 illustrates a block diagram of a first embodiment in which one or more adjacent tracks are written to a selected stride, in response to a defragmentation of a stride being faster in comparison to a destaging of tracks, in accordance with certain embodiments.

FIG. 2 illustrates a block diagram 200 of a first embodiment 202 in which one or more adjacent tracks are written to a selected stride, in response to a defragmentation of a stride being faster in comparison to a destaging of tracks, in accordance with certain embodiments.

In the first embodiment 202 shown in FIG. 2, one or more adjacent tracks shown as track 777 (reference numeral 204), track 778 (reference numeral 206), track 779 (reference numeral 208) and track 780 (reference numeral 210) are to be written to a selected stride 212, wherein the selected stride 212 may be a stride of the RAID array 104 that is shown in FIG. 1.

It can be seen that while four consecutive tracks numbered 777, 778, 779, 780 (shown via reference numerals 204, 206, 208, 210) are to be written to the selected stride 212, the selected stride 212 does have adequate contiguously located free space to accommodate the four consecutive tracks that are to be written. For example, while there is enough free space (shown via reference numerals 214, 216, 218, 220, 222) to place five tracks, the existing tracks (track #A 224, track #B 226, and track #C 228) are stored in a configuration such that the four consecutive tracks 777, 778, 779, 780 (shown via reference numerals 204, 206, 208, 210) cannot be stored contiguously within the free space of the selected stride 212.

In certain embodiments, the management application 114 may determine that to create contiguous space for storing the four consecutive tracks numbered 777, 778, 779, 780 (shown via reference numerals 204, 206, 208, 210) a defragmenting of the selected stride 212 is faster in comparison to destaging tracks from the selected stride 212. For example, in certain embodiments the management application 114 may determine that the estimated time taken to perform operations to destage track #B 226 is likely is be more than the estimated time taken to perform operations to defragment the selected stride 212, where the destaging of track #B 226 is also a plausible mechanism to create adequate contiguous free space to store the four consecutive tracks numbered 777, 778, 779, 780 (shown via reference numerals 204, 206, 208, 210) contiguously within the selected stride 212. In such embodiments, the management application 114 initiates the execution of the defragmentation application 116 to defragment the selected stride 212. The configuration of the selected stride 212 after defragmentation is shown via reference numeral 230. The existing tracks have been coalesced at the beginning of the stride and the free space follows at the end of the coalesced tracks. There is now adequate contiguous space 232, 234, 236, 238, 240 to store the four consecutive tracks numbered 777, 778, 779, 780 (shown via reference numerals 204, 206, 208, 210) contiguously within the defragmented stride 230.

The management application 114 continues execution after the defragmentation is over and writes the four consecutive tracks numbered 777, 778, 779, 780 (shown via reference numerals 204, 206, 208, 210) in the defragmented stride 230 to arrive at the configuration of the selected stride shown via reference numeral 242. In the configuration 242 of the selected stride the contiguous placement of the four consecutive tracks numbered tracks 777, 778, 779, 780 are shown via reference numerals 244, 246, 248, 250.

Therefore, FIG. 2 illustrates certain embodiments in which defragmentation of a stride is estimated to be faster in comparison to a destaging of tracks, and as a result defragmentation of the stride is performed to accommodate adjacent tracks contiguously within the stride.

Figure 3:
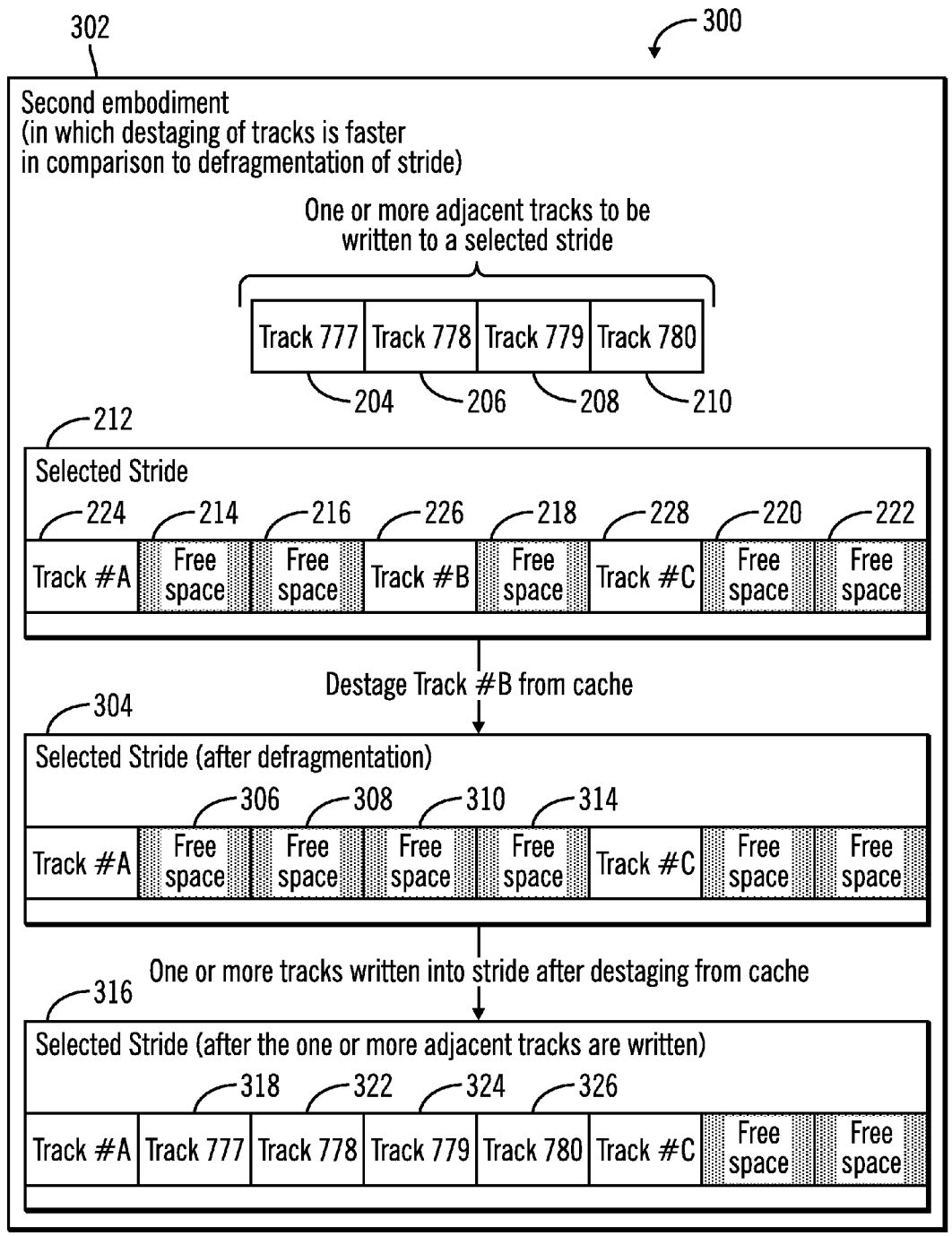
FIG. 3 illustrates a block diagram of a second embodiment in which one or more adjacent tracks are written to a selected stride, in response to a destaging of tracks being faster in comparison to a defragmentation of a stride, in accordance with certain embodiments.

FIG. 3 illustrates a block diagram 300 of a second embodiment 302 in which one or more adjacent tracks are written to a selected stride, in response to a destaging of tracks being faster in comparison to a defragmentation of a stride, in accordance with certain embodiments.

In the second embodiment 302 shown in FIG. 3, one or more adjacent tracks shown as track 777 (reference numeral 204), track 778 (reference numeral 206), track 779 (reference numeral 208) and track 780 (reference numeral 210) are to be written to a selected stride 212, wherein the selected stride 212 may be a stride of the RAID array 104 that is shown in FIG. 1.

It can be seen that while four consecutive tracks numbered 777, 778, 779, 780 (shown via reference numerals 204, 206, 208, 210) are to be written to the selected stride 212, the selected stride 212 does not have adequate contiguously located free space to accommodate the four consecutive tracks that are to be written. For example, while there is enough free space (shown via reference numerals 214, 216, 218, 220, 222) to place five tracks, the existing tracks (track #A 224, track #B 226, and track #C 228) are stored in a configuration such that the four consecutive tracks 777, 778, 779, 780 (shown via reference numerals 204, 206, 208, 210) cannot be stored contiguously within the free space of the selected stride 212.

In certain embodiments, the management application 114 may determine that to create contiguous space for storing the four consecutive tracks numbered 777, 778, 779, 780 (shown via reference numerals 204, 206, 208, 210) destaging tracks from the selected stride 212 is faster in comparison to defragmenting the selected stride 212. For example, in certain embodiments the management application 114 may determine that the estimated time taken to perform operations to destage track #B 226 is likely is be less than the estimated time taken to perform operations to defragment the selected stride 212, where the destaging of track #B 226 is a plausible mechanism to create adequate contiguous free space to store the four consecutive tracks numbered 777, 778, 779, 780 (shown via reference numerals 204, 206, 226 208, 210) contiguously within the selected stride 212. In such embodiments, the management application 114 initiates the execution of the destaging application 118 to destage track #B 226 from the selected stride 212 that is represented in the cache 108. The configuration of the selected stride 212 after destaging is shown via reference numeral 304. The free space indicated via reference numerals 306, 308, 310, 312 shows that there is now adequate contiguous space to accommodate the four consecutive tracks numbered 777, 778, 779, 780 (shown via reference numerals 204, 206, 208, 210).

The management application 114 continues execution after the destaging is over and writes the four consecutive tracks numbered 777, 778, 779, 780 (shown via reference numerals 204, 206, 208, 210) in the stride 304 that has undergone destaging, to arrive at the configuration of the selected stride shown via reference numeral 316. In the configuration 316 of the selected stride the contiguous placement of the four consecutive tracks numbered tracks 777, 778, 779, 780 are shown via reference numerals 318. 322, 324, 326.

Therefore, FIG. 3 illustrates certain embodiments in which destaging of tracks from a stride is estimated to be faster in comparison to a defragmentation of the stride, and as a result destaging of tracks of the stride is performed to accommodate adjacent tracks contiguously within the stride.

Figure 4:
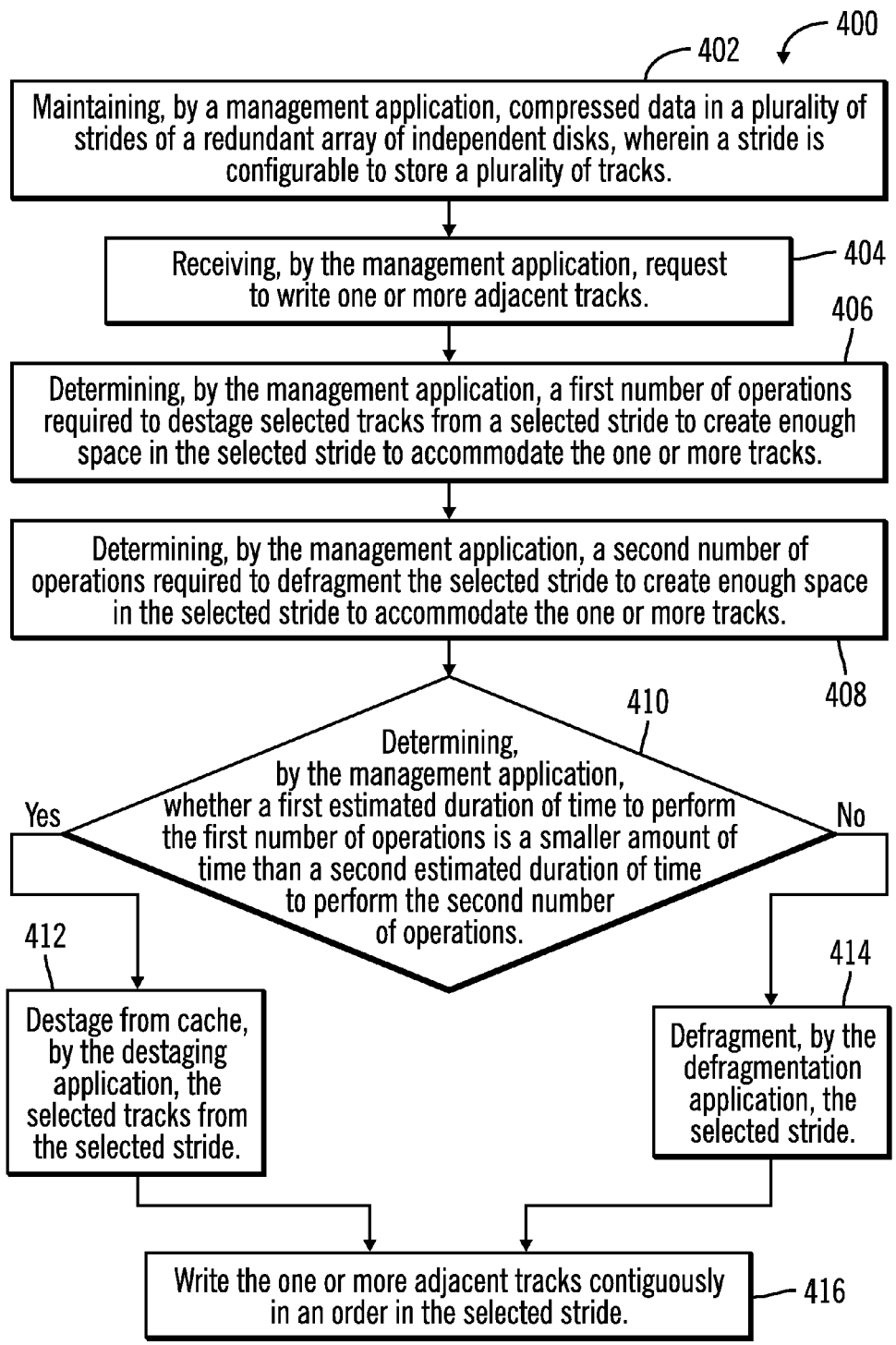
FIG. 4 illustrates a first flowchart that shows certain operations, in accordance with certain embodiments.

FIG. 4 illustrates a first flowchart 400 that shows certain operations, in accordance with certain embodiments. In certain embodiments, the operations shown in flowchart 400 may be performed by the management application 114, the defragmentation application 116, and the destaging application 118 that may be implemented in software, firmware, hardware or any combination thereof in the controller 102.

Control starts at block 402 in which the management application 114 maintains compressed data in one or more strides 110 of a RAID array 104, wherein a stride is configurable to store a plurality of tracks 112a . . . 112n. A request is received (at block 404), by the management application 114, to write one or more adjacent tracks (e.g., four consecutively numbered tracks 777, 778, 779, 780 shown via reference numerals 204, 206, 208, 210).

Control proceeds to block 406, in which the management application 114 determines a first number of operations required to destage selected tracks from a selected stride to create enough space in the selected stride to accommodate the one or more tracks that are to be written. The first number of operations required to destage selected tracks may be determined by analyzing the stride and track organization information 120 stored in the controller 102. The management application 114 then determines (at block 408) a second number of operations required to defragment the selected stride to create enough space in the selected stride to accommodate the one or more tracks. The second number of operations required to destage selected tracks may also be determined by analyzing the stride and track organization information 120 stored in the controller 102.

Control proceeds to block 410 in which the management application 414 determines whether a first estimated duration of time to perform the first number of operations to destage selected tracks is a smaller amount of time than a second estimated duration of time to perform the second number of operations to defragment the selected stride. For example, from stored measurements of time taken to perform certain operations for defragmenting or destaging in the past, the management application 114 may estimate the first and second estimated duration of time. For example, if an operation to destage each track has on an average taken 3 micro seconds during previous destagings, then the time taken to destage 40 tracks may be estimated to be 40 times 3 microseconds, which is 120 microseconds.

If at block 410 it is determined that the first estimated duration of time to perform the first number of operations to destage selected tracks is a smaller amount of time than the second estimated duration of time to perform the second number of operations to defragment the selected stride ("Yes" branch from block 410) then control proceeds to block 412 in which the destaging application 118 destages from the cache 108 selected tracks from the selected stride to create adequate contiguous space to write the one or more adjacent tracks contiguously on the selected stride.

If at block 410 it is determined that the first estimated duration of time to perform the first number of operations to destage selected tracks is not a smaller amount of time than the second estimated duration of time to perform the second number of operations to defragment the selected stride ("No" branch from block 410) then control proceeds to block 414 in which the defragmentation application 116 defragments the selected stride to create adequate contiguous space to write the one or more adjacent tracks contiguously on the selected stride.

From blocks 412 and 414 control proceeds to block 416 in which the management application 114 writes the one or more adjacent tracks both in a consecutive order and contiguously in the selected stride.

Therefore, FIG. 4 illustrates certain embodiments in which adequate free space is created in a selected stride by either destaging tracks or defragmenting the selected stride based on determining which action is likely to be performed faster.

Figure 5:
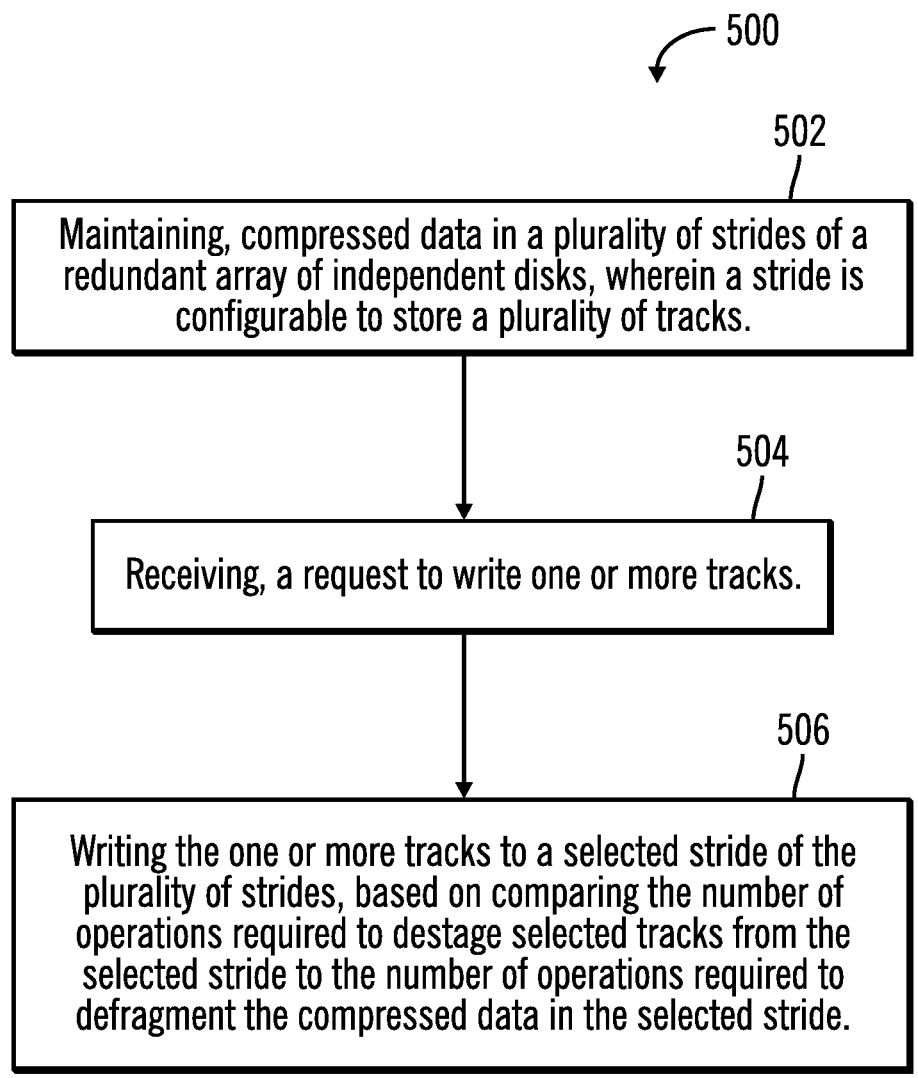
FIG. 5 illustrates a second flowchart that shows certain operations, in accordance with certain embodiments.

FIG. 5 illustrates a second flowchart 500 that shows certain operations, in accordance with certain embodiments. In certain embodiments, the operations shown in flowchart 500 may be performed by the management application 114, the defragmentation application 116, and the destaging application 118 that may be implemented in software, firmware, hardware or any combination thereof in the controller 102.

Control starts at block 502, in which compressed data is maintained in a plurality of strides 110 of a redundant array of independent disks 104, wherein a stride 110 is configurable to store a plurality of tracks 112a ... 112n. A request is received (at block 504) to write one or more tracks 204, 206, 208, 210.

Control proceeds to block 506, in the one or more tracks are written to a selected stride of the plurality of strides, based on comparing the number of operations required to destage selected tracks from the selected stride to the number of operations required to defragment the compressed data in the selected stride (e.g., as shown in embodiments 202, 302).

Therefore, FIG. 1-5 illustrates certain embodiments in which tracks that are numbered consecutively are placed adjacent to each other in contiguous free space on a single stride, wherein the contiguous free space is created either via the destaging of tracks or via defragmentation of the single stride, based on whether destaging or defragmentation is faster to perform.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Oracle and/or its affiliates.
* IBM, FlashCopy are trademarks or registered trademarks of International Business Machines Corporation.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
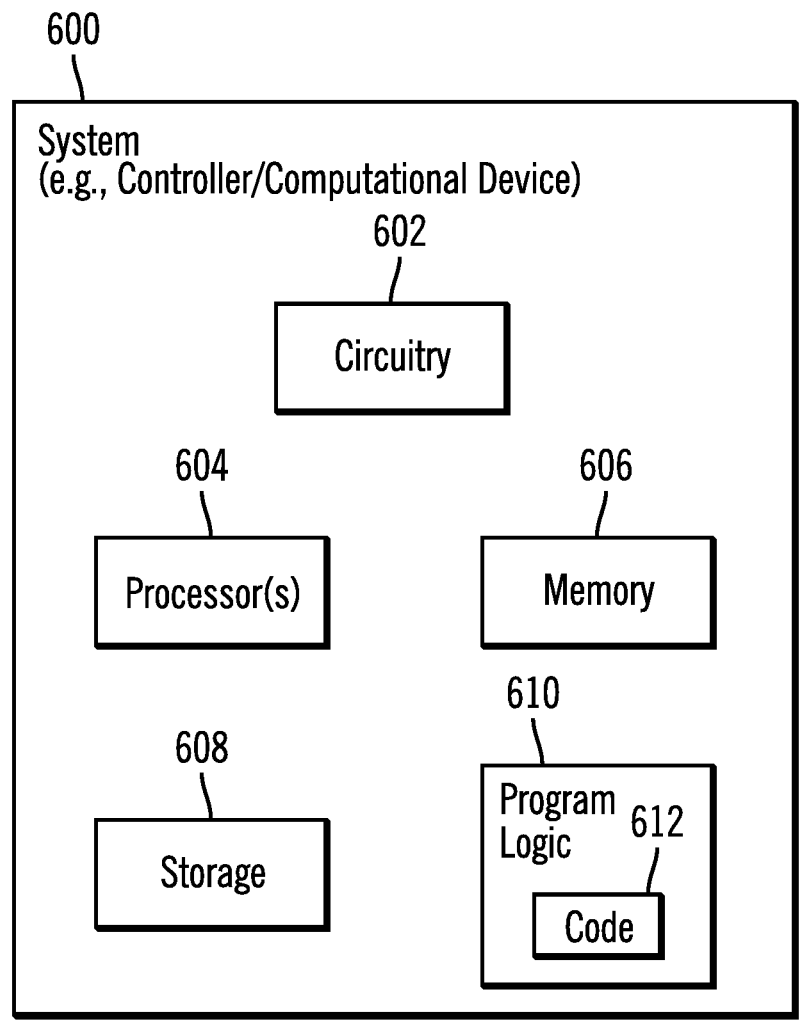
FIG. 6 illustrates a block diagram of a computational system that shows certain elements that may be included in the controller of FIG. 1, in accordance with certain embodiments.

FIG. 6 illustrates a block diagram that shows certain elements that may be included in the controller 102 or the host 106 in accordance with certain embodiments. The system 600 may comprise the controller 102 or the host 106 and may include a circuitry 602 that may in certain embodiments include at least a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 6 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:
1. A system, comprising:
a solid state device comprising a cache that logically represents a redundant array of independent disks maintaining compressed data in a plurality of strides; and
a controller controlling the solid state device, the controller performing operations, the operations comprising:
receiving a request to write one or more tracks; and writing the one or more tracks to a stride of the plurality of strides by creating contiguous free space on the stride either via destaging of selected tracks or via defragmentation of the stride, in response to determining whether the destaging or the defragmentation is faster.

2. The system of claim 1, wherein tracks that are numbered consecutively are placed adjacent to each other in the contiguous free space.

3. The system of claim 1, wherein the stride is represented in the cache, the operations further comprising:
   determining, by a management application executing in the controller, whether a first estimated duration of time to perform a number of operations required to destage the selected tracks from the stride represented in the cache is a smaller amount of time in comparison to a second estimated duration of time required to defragment compressed data in the stride represented in the cache; and
   destaging the selected tracks from the cache, by a destaging application executing in the controller, in response to determining that the first estimated duration of time is a smaller amount of time in comparison to the second estimated duration of time.

4. The system of claim 3, the operations further comprising:
   defragmenting, by a defragmentation application executing in the controller, the stride, in response to determining that the first estimated duration of time is not a smaller amount of time in comparison to the second estimated duration of time.

5. The system of claim 4, wherein:
   the writing the one or more tracks to the stride is performed subsequent to the destaging or the defragmenting; and
   the destaging or the defragmenting creates adequate space in the stride to write the one or more tracks.

6. The system of claim 3, wherein:
   the destaging of the selected tracks is performed by copying the selected tracks from the cache to physical storage, and by deleting the selected tracks in the stride represented in the cache; and
   the defragmentation of the stride is performed by moving existing tracks in the stride adjacent to each other towards the beginning of the stride and creating contiguous free space towards the end of the stride.

7. A method, comprising:
   logically representing via a solid state device comprising a cache, a redundant array of independent disks maintaining compressed data in a plurality of strides; and
   receiving, by a controller controlling the solid state device, a request to write one or more tracks; and
   writing the one or more tracks to a stride of the plurality of strides by creating contiguous free space on the stride either via destaging of selected tracks or via defragmentation of the stride, in response to determining whether the destaging or the defragmentation is faster.

8. The method of claim 7, wherein tracks that are numbered consecutively are placed adjacent to each other in the contiguous free space.

9. The method of claim 7, wherein the stride is represented in the cache, the operations further comprising:
   determining, by a management application executing in the controller, whether a first estimated duration of time to perform a number of operations required to destage the selected tracks from the stride represented in the cache is a smaller amount of time in comparison to a second estimated duration of time required to defragment compressed data in the stride represented in the cache; and
   destaging the selected tracks from the cache, by a destaging application executing in the controller, in response to determining that the first estimated duration of time is a smaller amount of time in comparison to the second estimated duration of time.

10. The method of claim 9, the method further comprising:
    defragmenting, by a defragmentation application executing in the controller, the stride, in response to determining that the first estimated duration of time is not a smaller amount of time in comparison to the second estimated duration of time.

11. The method of claim 10, wherein:
    the writing the one or more tracks to the stride is performed subsequent to the destaging or the defragmenting; and
    the destaging or the defragmenting creates adequate space in the stride to write the one or more tracks.

12. The method of claim 9, wherein:
    the destaging of the selected tracks is performed by copying the selected tracks from the cache to physical storage, and by deleting the selected tracks in the stride represented in the cache; and
    the defragmentation of the stride is performed by moving existing tracks in the stride adjacent to each other towards the beginning of the stride and creating contiguous free space towards the end of the stride.

13. A computer program product, the computer program product comprising:
    a computer readable storage medium having computer readable program code embodied therewith, the computer readable program code configured to perform operations, the operations comprising:
    logically representing via a solid state device comprising a cache, a redundant array of independent disks maintaining compressed data in a plurality of strides; and
    receiving, by a controller controlling the solid state device, a request to write one or more tracks; and
    writing the one or more tracks to a stride of the plurality of strides by creating contiguous free space on the stride either via destaging of selected tracks or via defragmentation of the stride, in response to determining whether the destaging or the defragmentation is faster.

14. The computer program product of claim 13, wherein tracks that are numbered consecutively are placed adjacent to each other in the contiguous free space.

15. The computer program product of claim 13, wherein the stride is represented in the cache, the operations further comprising:
    determining, by a management application executing in the controller, whether a first estimated duration of time to perform a number of operations required to destage the selected tracks from the stride represented in the cache is a smaller amount of time in comparison to a second estimated duration of time required to defragment compressed data in the stride represented in the cache; and
    destaging the selected tracks from the cache, by a destaging application executing in the controller, in response to determining that the first estimated duration of time is a smaller amount of time in comparison to the second estimated duration of time.

16. The computer program product of claim 15, the operations further comprising:
    defragmenting, by a defragmentation application executing in the controller, the stride, in response to determining that the first estimated duration of time is not a smaller amount of time in comparison to the second estimated duration of time.

17. The computer program product of claim 16, wherein:
the writing the one or more tracks to the stride is performed subsequent to the destaging or the defragmenting; and
the destaging or the defragmenting creates adequate space in the stride to write the one or more tracks.

18. The computer program product of claim 15, wherein:
the destaging of the selected tracks is performed by copying the selected tracks from the cache to physical storage, and by deleting the selected tracks in the stride represented in the cache; and
the defragmentation of the stride is performed by moving existing tracks in the stride adjacent to each other towards the beginning of the stride and creating contiguous free space towards the end of the stride.

* * * * *